(No Model.)  
J. SCHERFFIUS.  
SYSTEM OF HEATING AND VENTILATION.  
No. 495,567.  
Patented Apr. 18, 1893.
2 Sheets—Sheet 1.
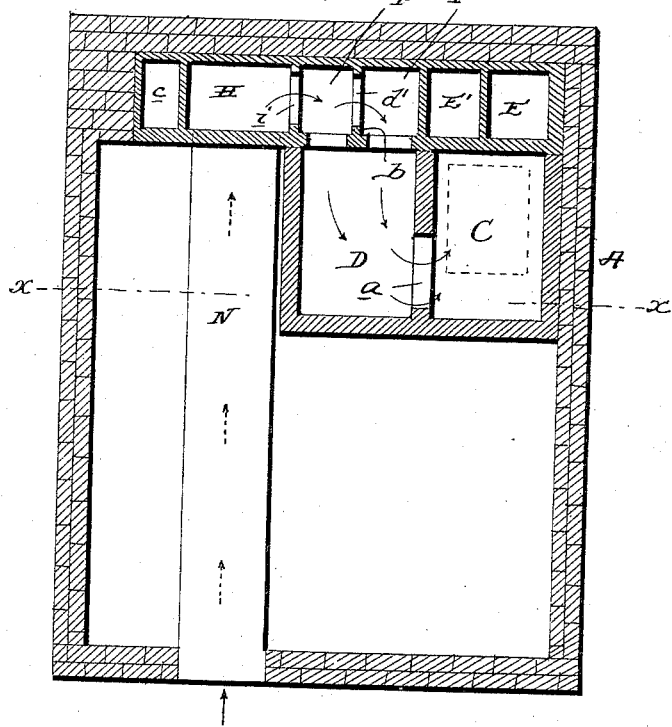
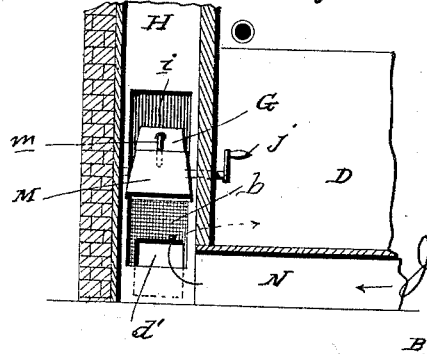
Witnesses:  
C. H. Raeder  
N. F. Matthews.
Inventor  
Jacob Scherffius  
By James Sheehy  
Attorney (No Model.) 2 Sheets—Sheet 2.
J. SCHERFFIUS.
SYSTEM OF HEATING AND VENTILATION.
No. 495,567. Patented Apr. 18, 1893.
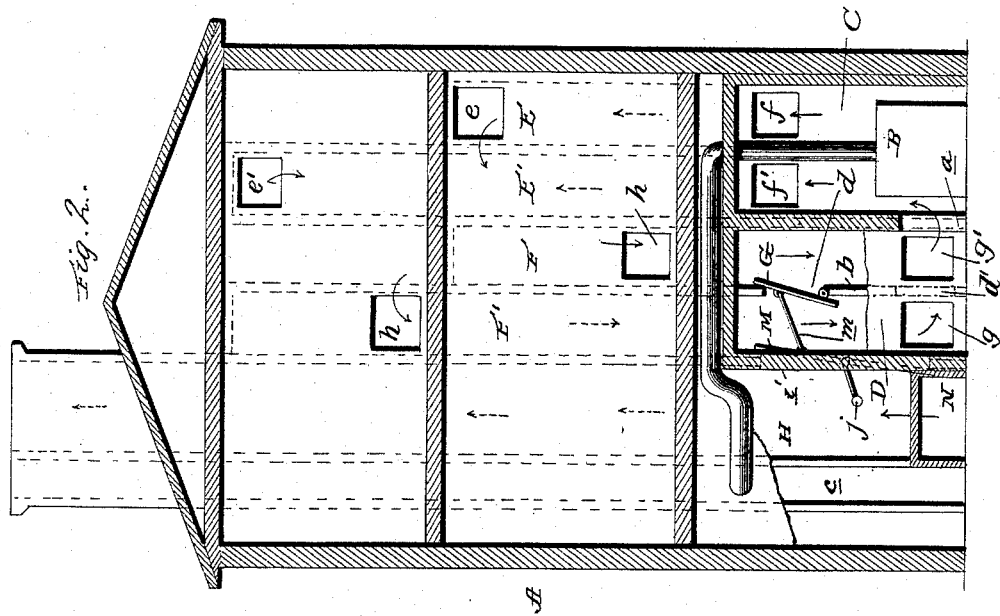
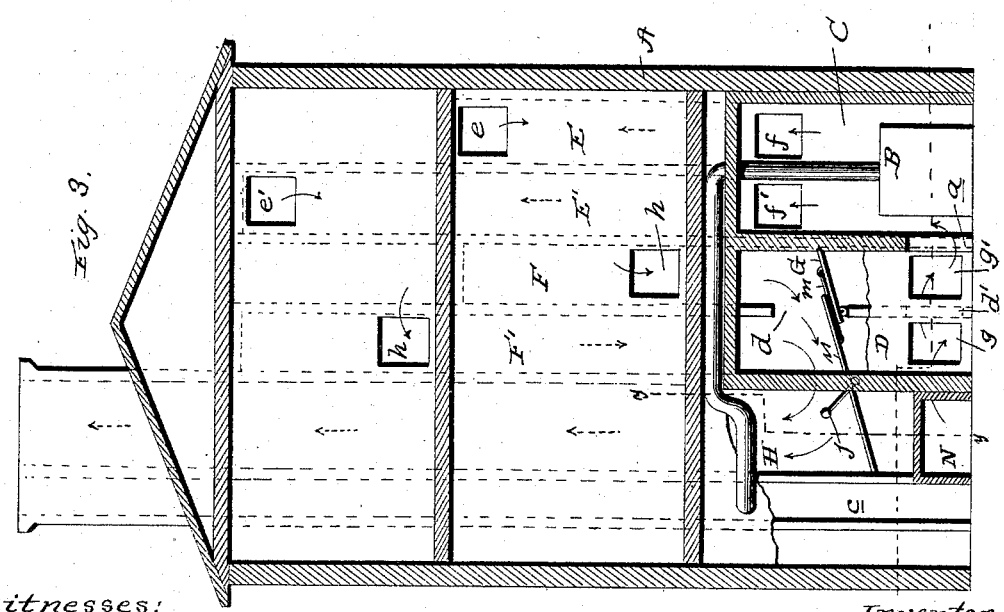

UNITED STATES PATENT OFFICE.

JACOB SCHERFFIUS, OF WINONA, MINNESOTA.

SYSTEM OF HEATING AND VENTILATION.

SPECIFICATION forming part of Letters Patent No. 495,567, dated April 18, 1893.

Application filed October 24, 1892. Serial No. 449,792. (No model.)

*To all whom it may concern:*

Be it known that I, JACOB SCHERFFIUS, a citizen of the United States, residing at Winona, in the county of Winona and State of Minnesota, have invented certain new and useful Improvements in Systems of Heating and Ventilation; and I do declare the following to be a full, clear, and exact description of the invention, such as will enable others skilled in the art to which it appertains to make and use the same.

My invention has relation to improvements in ventilating and heating buildings and it consists in an arrangement of flues and dampers which latter are adapted to be adjusted so that air may be conducted from the open air past a furnace or other heating agent to an apartment or apartments to be heated and from said apartment or apartments to the open air; and which dampers are also adapted to be adjusted to shut off the supply of fresh air and the discharge of heated air so that the heated air in the rooms will be conducted back and past the furnace or heating agents and be reheated; the first mentioned adjustment of the dampers being designed to effect a simultaneous heating and ventilation of the apartment or apartments, while the latter adjustment is designed to simply effect a high heating of the apartment or apartments which is desirable in very cold or damp weather.

With the foregoing in view, the invention will be fully understood from the following description and claims when taken in conjunction with the accompanying drawings in which:—

Figure 1, is a horizontal section taken through a basement of a building embodying my invention. Fig. 2, is a vertical section taken in the plane indicated by the line $x, x$, of Fig. 1, with the dampers adjusted to effect a high heating of the apartments. Fig. 3, is a similar view with the dampers adjusted to effect a simultaneous heating and ventilation of the apartments, and Fig. 4, is a detail section taken in the plane indicated by the line $y, y$, of Fig. 3.

Referring by letter to the said drawings:—

A, indicates a building which may be of any approved construction; and B, indicates a furnace arranged in a furnace chamber C, which chamber is preferably built or placed in the basement of the building as shown.

Formed in one of the side walls of the furnace chamber C, and preferably adjacent to the bottom thereof, is a port $a$, which communicates with a chamber D, which for convenience of description I will term a fresh air chamber. E, E′, indicate the flues for leading the heated air from the furnace chamber to the apartments to be heated which flues are connected with the furnace chamber, by the ports $f, f'$, and with the apartments to be heated by the ports $e, e'$, which latter ports are preferably arranged adjacent to the ceilings, so that the heated air will displace the air in the room and force the same down and out as will be presently explained.

F, F′, indicate the flues for leading the heated and impure air from the apartments which flues are connected with the fresh air chamber by the ports $g, g'$, and are connected with the apartments by the ports $h$, as shown.

Formed in the party wall $b$, of the flues F, F′, is a port $d$, and a port $d'$, which port $d$, is controlled by the pivoted damper G, and formed in the wall of the flue F′, opposite to the party wall $b$, is a port $i$, which communicates with the uptake H, and is controlled by the pivoted damper M, which is adapted to be manipulated by the crank $j$, a hand wheel or other suitable device.

Leading from the open air to the lower end of the uptake H, which is preferably arranged at the side of the smoke flue or chimney $c$, is the induction flue N, through which fresh air is led into the building.

The port $d'$, serves to lead the fresh air from the flue F′, to the flue F, when the pivoted dampers are in the position shown in Fig. 3.

As better shown in Fig. 2, of the drawings the dampers G, M, are connected by a link $m$, so that when the damper M, is moved, the damper G, will be moved in a corresponding direction. These dampers G, M, are of such a size that when in their approximately vertical position as shown in Fig. 2, the damper G, will close the port $d$, and the damper M, will close the port $i$, so that the air coming down the flues F, F′, will take through the ports $g, g'$, into the fresh air chamber and from the said chamber into the furnace chamber to be reheated; and when the said dampers are in their approximately horizontal position, the damper M, will extend across the uptake H, and the flue F', while the damper G, will extend across and close the flue F, so that the foul air will be led from the flues F, F', to the uptake H, and through the same to the open air.

In practice when it is desired to ventilate a building as well as to heat the same, the dampers G, M, are adjusted to the positions shown in Fig. 3, so that the fresh air will take through the flue N, the port $i$, the flue F', the port $d'$, the ports $g, g'$, the chamber G, the port $a$, the chamber C, the ports $f, f'$, the flues E, E', the ports $e, e'$, the apartments, the ports $h$, the flues F, F', and the port $i$, to the uptake H, through the medium of which it is conducted to the open air. Thus it will be seen that not only are the apartments heated and ventilated at once but the fresh air is heated *en route* to the apartments inasmuch as it passes through the furnace chamber C.

When it is simply desired to highly heat the apartments the dampers G, M, are adjusted to the positions shown in Fig. 2, so that the air will pass or circulate from the furnace chamber C, through the ports $f, f'$, the flues E, E', the ports $e, e'$, the ports $h$, the flues F, F', the ports $g, g'$, the chamber G, and the port $a$, back to the furnace chamber where it will be reheated and again conducted to the apartments.

Although I have in some respects specifically described the construction and relative arrangement of the several elements of my improvements, I do not desire to be confined to the same as such changes or modifications may be made as fairly fall within the scope of my invention.

Having described my invention, what I claim is—

1. The combination of a furnace chamber, a flue communicating with said chamber and the apartment to be heated, the flues F, F', having the port $d$, in their party wall, the uptake H, communicating at its lower end with the open air, the port $i$, formed in the party wall of the flue F, and uptake H, a suitable means for connecting the flues F, F', and the furnace chamber, a valve G, adapted to alternately close the port $d$, and the flue F', a valve M, adapted to alternately close the port $i$, and the flue F, and uptake H, and a suitable means for connecting said valves G, and M, so that they will move in concert, substantially as and for the purpose specified.

2. The combination with a furnace chamber, a fresh air chamber arranged adjacent to and connected with the furnace chamber, a flue communicating with the furnace chamber and the apartment to be heated, the flues F, F', communicating with the fresh air chamber and the apartment or apartments, and having the port $d$, in their party wall, the uptake H, communicating at its lower end with the open air, and the port $i$, formed in the party wall of the flue F, and uptake H, of the valve G, pivotally connected to the lower wall of the port $d$, the valve M, pivoted at an intermediate point of its length to the side walls of the port $i$, and a suitable means for connecting said valves so that they will move in unison, substantially as specified.

3. The combination of a furnace chamber, a flue communicating with said chamber and the apartment to be heated, the flues F, F', communicating with the furnace chamber and having the port $d$, in their party wall, the uptake H, communicating at its upper and lower ends with the open air, the port $i$, formed in the party wall of the flue F, and the uptake, and valves arranged in the ports $d$, and $i$, the said valves being adapted to be adjusted to close the ports and permit the air from the apartment to pass again through the furnace chamber, and to open the ports and close the flue F, and the uptake H, so that the air from the apartment will be led from the flues F, F', up the uptake, substantially as and for the purpose set forth.

In testimony whereof I affix my signature in presence of two witnesses.

JACOB SCHERFFIUS.

Witnesses:
 D. E. VANCE,
 J. N. MAYBURY.